United States Patent
Daicho et al.

Patent Number: 5,606,120
Date of Patent: Feb. 25, 1997

[54] MISFIRE-DETECTING SYSTEM FOR INTERNAL COMBUSTION ENGINES

[75] Inventors: Hisashi Daicho; Fumio Hara, both of Wako, Japan

[73] Assignee: Honda Giken Kogyo Kabushiki Kaisha, Tokyo, Japan

[21] Appl. No.: 550,100

[22] Filed: Oct. 30, 1995

[30] Foreign Application Priority Data

Oct. 31, 1994 [JP] Japan ............................ 6-290698

[51] Int. Cl.$^6$ ............................ F02D 45/00; G01M 15/00
[52] U.S. Cl. .................... 73/117.3; 73/116; 364/431.03; 123/425
[58] Field of Search .................... 73/116, 117.2, 73/117.3; 123/425, 419, 436; 364/431.03, 431.05

[56] References Cited

U.S. PATENT DOCUMENTS

| | | | |
|---|---|---|---|
| 3,931,619 | 1/1976 | Moore et al. ............................ | 73/116 |
| 4,546,646 | 10/1985 | Takahashi ............................ | 73/117.3 |
| 4,969,104 | 11/1990 | Suzuki et al. ............................ | 73/117.3 |
| 5,044,336 | 9/1991 | Fukui ............................ | 73/116 |
| 5,309,756 | 5/1994 | Osawa et al. ............................ | 73/116 |
| 5,349,936 | 9/1994 | Uchinami ............................ | 73/117.3 |
| 5,357,790 | 10/1994 | Hosoya ............................ | 73/117.3 |
| 5,415,035 | 5/1995 | Shimasaki et al. ............................ | 73/117.3 |
| 5,426,587 | 6/1995 | Imai et al. ............................ | 123/436 |
| 5,440,922 | 8/1995 | Ichikawa ............................ | 73/117.3 |
| 5,471,869 | 12/1995 | Kuroda et al. ............................ | 73/116 |

FOREIGN PATENT DOCUMENTS

5-321748  12/1993  Japan .

*Primary Examiner*—Elizabeth L. Dougherty
*Assistant Examiner*—George M. Dombroske
*Attorney, Agent, or Firm*—Nikaido, Marmelstein, Murray & Oram LLP

[57] ABSTRACT

A misfire-detecting system for an internal combustion engine includes a temperature sensor for detecting a temperature of the engine, and an ECU which carries out detection of a misfire occurring in the engine when the detected temperature falls within a predetermined region. A load condition of the engine is detected, and the predetermined region is changed according to the detected load condition of the engine.

9 Claims, 3 Drawing Sheets

MISFIRE-DETECTING SYSTEM FOR INTERNAL COMBUSTION ENGINES

BACKGROUND OF THE INVENTION

1. Field of the Invention

This invention relates to a misfire-detecting system for internal combustion engines, which detects misfires occurring in the engine.

2. Prior Art

Conventionally, various misfire-detecting systems for internal combustion engines have been proposed. The present assignee has proposed a misfire-detecting system, for example, by Japanese Laid-Open Patent Publication (Kokai) No. 5-321748, which contemplates that a transient irregular combustion can occur depending on operating conditions of the engine or traveling conditions of a vehicle in which the engine is installed, and therefore inhibits the misfire determination when the engine coolant temperature or the intake air temperature is lower than a predetermined value, when the engine is operating in a transient condition in which at least one of the intake pipe pressure, the throttle valve opening, the traveling speed of the vehicle, etc. largely changes, or when the engine is operating in a low load condition such as traveling of the vehicle on a downhill road at a high altitude.

When the vehicle is in stoppage (standing condition), the engine is in a no-load condition in which a smaller amount of intake air is supplied to the engine than during traveling of the vehicle and no inertia force acts upon the driving system of the engine so that the combustion state of the engine assumed during stoppage of the vehicle is more liable to influence the rotation of the crankshaft to cause fluctuations thereof than during traveling of the vehicle. In the conventional proposed systems, however, the same predetermined engine coolant temperature value is employed for determining whether or not misfire detection is to be permitted, between during traveling of the vehicle and during stoppage of the same.

As a result, if the predetermined engine coolant temperature value for determining permission of misfire detection is set to a low value enough to conform to operating conditions of the engine during traveling of the vehicle, there is a high possibility that an erroneous determination can be made as to occurrence of a misfire since the combustion state is unstable if the engine coolant temperature is low when the vehicle is in stoppage.

On the other hand, if the predetermined engine coolant temperature value is set to a high value enough to conform to operating conditions of the engine during stoppage of the vehicle, it results in a too narrow engine coolant temperature range in which the misfire detection can be carried out, because the misfire detection can be carried out at a lower coolant temperature than the above range when the vehicle is traveling.

SUMMARY OF THE INVENTION

It is the object of the invention to provide a misfire-detecting system for internal combustion engines, which is capable of preventing erroneous misfire detection when the engine is in a no-load condition, such as during stoppage of the vehicle, as well as enlarging an engine coolant temperature range in which the misfire detection can be carried out when the engine is in a loaded condition, such as during traveling of the vehicle.

To attain the above object, the present invention provides a misfire-detecting system for an internal combustion engine, comprising:

temperature-detecting means for detecting a temperature of the engine;

misfire-detecting means for carrying out detection of a misfire occurring in the engine when the detected temperature falls within a predetermined region; and changing means for detecting a load condition of the engine, and for changing the predetermined region according to the detected load condition of the engine.

Preferably, the changing means sets the predetermined region to a narrower region by raising a lower limit value of the predetermined region as load on the engine is smaller.

In a preferred embodiment of the invention, the changing means detects a no-load condition of the engine, and sets the predetermined region to a narrower region than in a loaded condition of the engine, by raising a lower limit value of the predetermined region when the no-load condition of the engine is detected.

Typically, the no-load condition is a standing condition of a vehicle in which the engine is installed.

Preferably, the temperature of the engine is a temperature of coolant of the engine.

The above objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
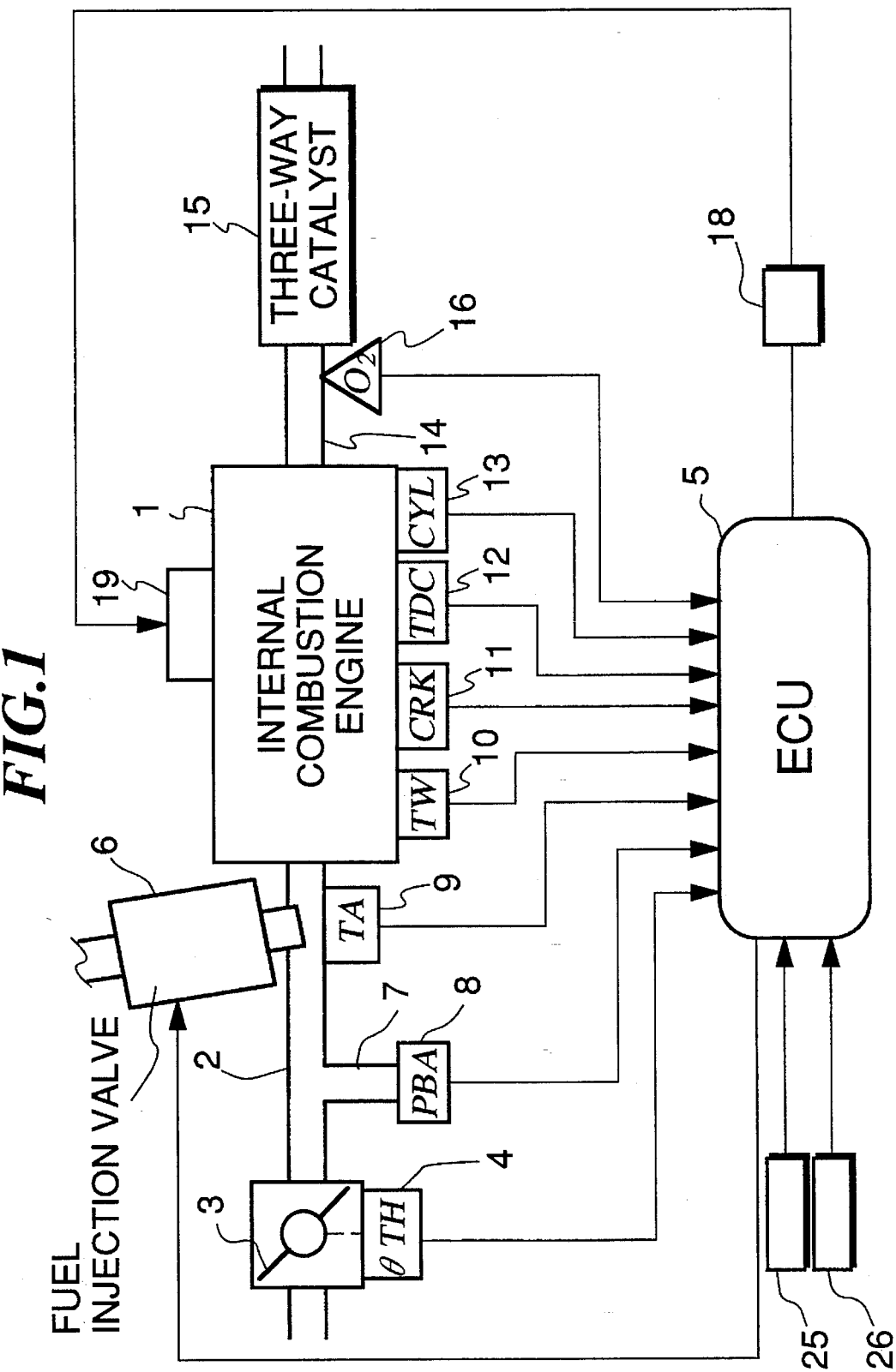
FIG. 1 is a block diagram schematically showing the whole arrangement of an internal combustion engine and a misfire-detecting system therefor, according to an embodiment of the invention.

Referring first to FIG. 1, there is schematically illustrated the whole arrangement of an internal combustion engine (hereinafter referred to as "the engine") and a misfire-detecting system therefor, according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening θTH and supplying the same to an electronic control unit (hereinafter referred to as "the ECU") 5.

Fuel injection valves 6, only one of which is shown, are provided for respective cylinders of the engine 1 and each arranged in the intake pipe 2 at a location between the engine 1 and the throttle valve 3 and slightly upstream of a corresponding intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3, for supplying an electric signal indicative of the sensed absolute pressure to the ECU 5. An intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The TDC sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the three-way catalyst 15, which detects the concentration of oxygen present in exhaust gases and supplies an electric signal indicative of the senses oxygen concentration to the ECU 5.

Further electrically connected to the ECU 5 are power switches 25 of various kinds of electric loads such as an air conditioner, and a transmission 26, and electric signals indicative of the ON/OFF states of the switches 25 and the state of the transmission 26 are supplied to the ECU 5. The transmission 26 may be a known automatic transmission or a known manual transmission.

The ECU 5 is comprised of an input circuit having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU"), memory means storing various operational programs which are executed by the CPU and for storing results of calculations therefrom, etc., and an output circuit which delivers driving signals to the fuel injection valves 6, the distributor 18, etc.

The CPU of the ECU 5 operates in response to signals from various engine parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$Tout = Ti \times KO2 \times K1 + K2 \tag{1}$$

where Ti represents a basic value of the fuel injection period Tout, which is determined according to the engine rotational speed NE and the intake pipe absolute pressure PBA, by the use of a Ti map, not shown, which is stored in the memory means.

KO2 represents an air-fuel ratio correction coefficient calculated based on the output signal from the O2 sensor 16, which is set to such a value that the air-fuel ratio (oxygen concentration) detected by the O2 sensor 16 becomes equal to a desired value when the engine 1 is operating in the air-fuel ratio feedback control region, while it is set to predetermined values corresponding to the respective air-fuel ratio open-loop control regions of the engine 1 when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

Further, the CPU of the ECU calculates the ignition timing θIG of each of the spark plugs 19, based on the determined engine operating conditions. Driving signals corresponding to the TOUT and θIG values calculated as above are delivered via the output circuit to the fuel injection valves 6 and the spark plugs 19 to drive them.

Figure 2:
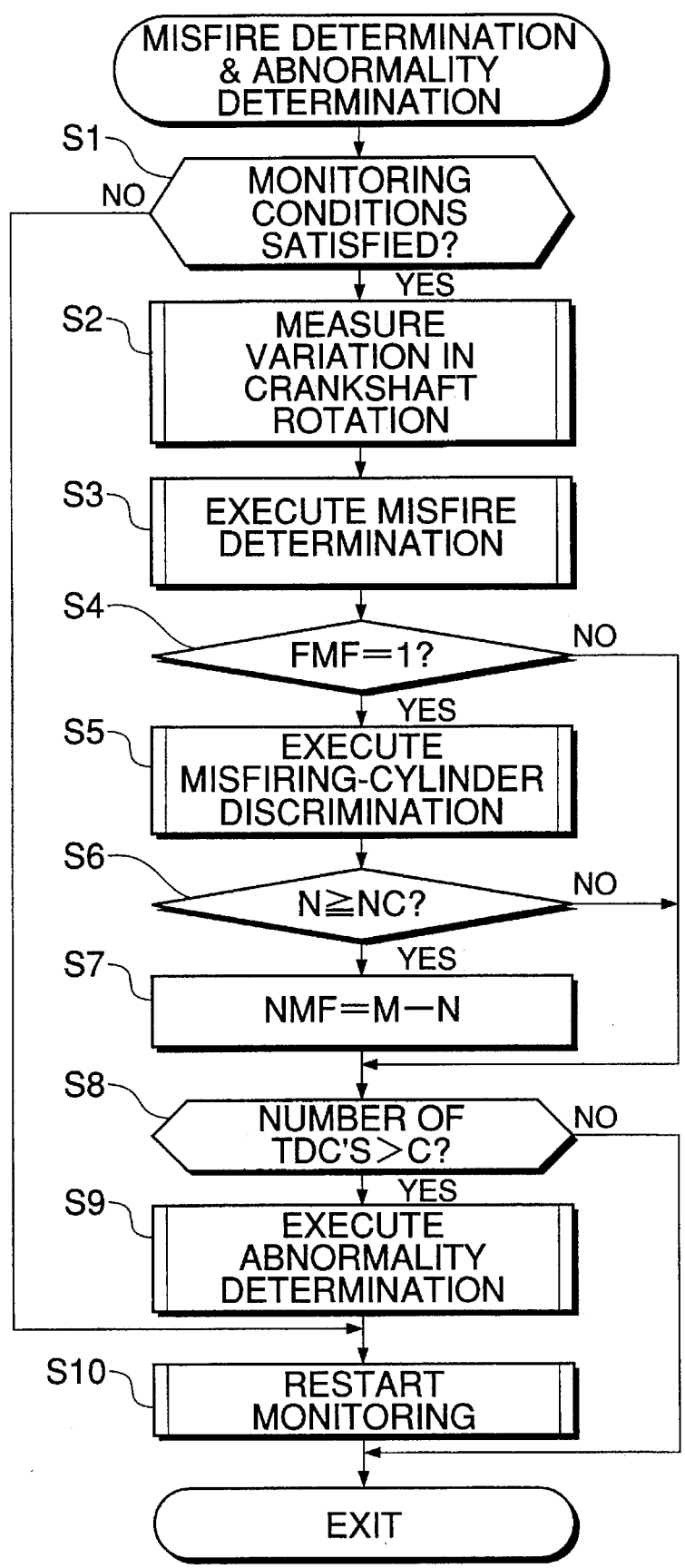
FIG. 2 is a flowchart showing a program for carrying out misfire determination and abnormality determination.

FIG. 2 shows a program for carrying out misfire determination based on a variation in the rotation of the crankshaft of the engine 1, and abnormality determination of the entire system, based on results of the misfire determination. This program is executed in synchronism with generation of TDC signal pulses.

First, at a step S1, it is determined whether or not monitoring conditions, i.e. conditions for carrying out the misfire determination are satisfied. The determination as to whether or not the monitoring conditions are satisfied is executed according to a program of FIG. 3, described hereinafter.

Figure 3:
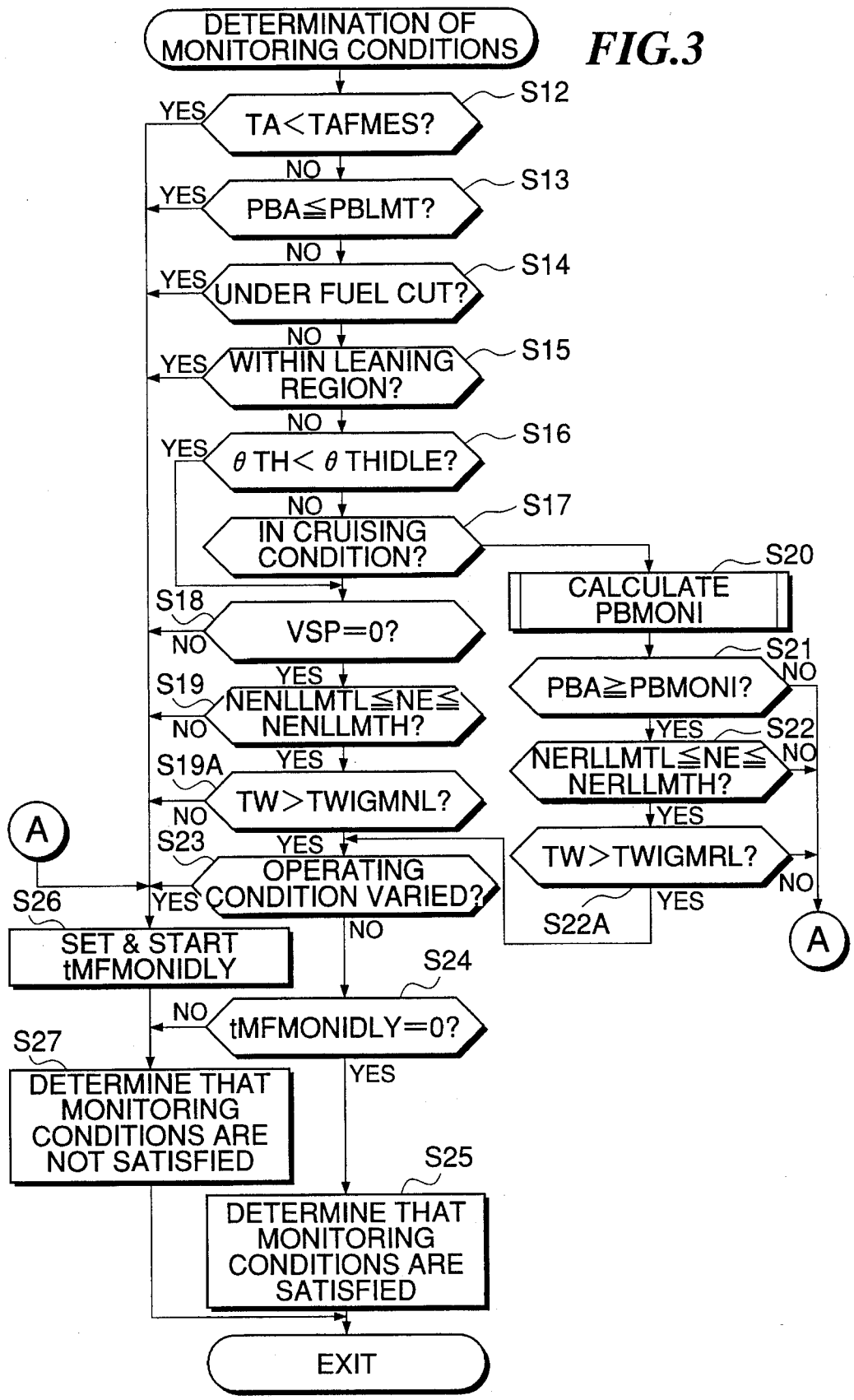
FIG. 3 is a flowchart showing a program for determining whether or not monitoring conditions for carrying out the misfire determination are satisfied.

If the monitoring conditions are not satisfied, the program jumps to a step S10, wherein the monitoring condition-determining program of FIG. 3 is restarted (restarting of monitoring).

On the other hand, if the monitoring conditions are satisfied, the program proceeds to a step S2, wherein a variation in the crankshaft rotation is measured.

More specifically, a time period TREV(n) over which the crankshaft rotates through 210° is measured from CRK signal pulses, and a difference ΔTREV(n) between the measured TREV(n) value and a time period TREV(n-1) measured in the immediately preceding loop is calculated.

The thus calculated difference ΔTREV(n) is compared with an average value of values of differences ΔTREV(n-1), ΔTREV(n-2), and ΔTREV(n-3) calculated earlier, and the difference between the difference Δ TREV(n) and the average value is calculated as an amount of variation ΔΔTREV(n) in the rotation.

Then, at a step S3, a misfire-determining map is selected according to the type of the transmission 26 and the state of engagement of a clutch of the engine, to determine a misfire-determining reference value MFDEL. The amount of variation ΔΔTREV(n) is compared with the misfire-determining reference value MFDEL, and if the former is larger than the latter, it is determined that a misfire has occurred, and then a flag FMF is set to "1". On the other hand, if the amount of variation ΔΔTREV(n) is smaller than the reference value MFDEL, the flag FMF is set to "0".

A plurality of misfire-determining maps are provided, and the selected map is retrieved to read out the misfire reference value MFDEL, according to the engine rotational speed NE and the intake pipe absolute pressure PBA.

Then, at a step S4, it is determined whether or not the flag FMF is set to "1". If the flag FMF is set to "0" the program jumps to a step S8, hereinafter referred to, whereas if the flag FMF is set to "1" the program proceeds to a step S5 to discriminate a cylinder in which a misfire has occurred. The discrimination of the misfiring cylinder is carried out by determining at which of TDC signal pulses generated after generation of the CYL signal pulse the misfire has been detected.

After the discrimination of the misfiring cylinder, the program proceeds to a step S6, wherein it is determined whether or not misfires have been continuously detected a predetermined number of times Nc or more. The predetermined number of times Nc is set to four when the engine is of the four-cylinder type.

More specifically, if misfires have been continuously detected, the misfiring cylinders are each discriminated according to a misfire-discriminating routine, not shown, whenever the TDC signal pulse is generated. The number of times N of continuous misfiring is counted, and it is determined whether or not the number of times N of continuous misfiring is larger than the predetermined number of times Nc.

If the number of times N of continuous misfiring is smaller than the predetermined number of times Nc, the program jumps to the step S8, whereas if the number of times N exceeds the predetermined number of times Nc, the program proceeds to a step 7, wherein a number of times NMF of misfiring is calculated by subtracting the number of times N of continuous misfires from a number of times M of detection of misfires, so as not to regard the number of times N of continuous firing as a number of times indicative of occurrence of misfires. Then, the program proceeds to the step S8.

At the step S8, it is determined whether or not the number of times of generation of TDC signal pulses after restarting of the monitoring exceeds a predetermined number of times C (e.g. 1000). If the number of times of generation of TDC signal pulses does not exceed the predetermined number of times C, the program is immediately terminated. On the other hand, if it exceeds, the program proceeds to a step S9, wherein abnormality determination is executed.

At the step S9, it is determined whether or not the variation in the crankshaft rotation has been measured over a predetermined number of times of the crankshaft rotation after restarting of the monitoring without a change in the operating condition of the engine, such as acceleration of the engine. If the answer is negative (NO), the misfire-detecting processing is immediately terminated, whereas if the answer is affirmative (YES), a misfiring rate φ is calculated. If the misfiring rate φ is larger than a predetermined value φ0, it is determined that the engine is in an abnormal state, whereas if the misfiring rate φ is smaller than the predetermined value φ0, it is determined that the engine is in a normal state. The misfiring rate φ represents the ratio of the number of times NMF of misfiring to the predetermined number of times C of generation of TDC signal pulses.

After the abnormality determination, the monitoring condition-determining program of FIG. 3 is restarted at a step S10, followed by terminating the present program.

The program of FIG. 3, which determines whether or not the monitoring conditions are satisfied, is executed as background processing.

First, it is determined whether or not the intake air temperature TA is lower than a predetermined value TAFMES (e.g. 0° C.) at a step S12, whether or not the intake pipe absolute value PBA is lower than a predetermined value PBLMT (e.g. 150 mmHg) at a step S13, whether or not the engine is under fuel cut at a step S14, and whether or not air-fuel ratio leaning control, which controls the air-fuel ratio of the mixture to a value leaner than a stoichiometric ratio, is being carried out at a step S15.

If any of the answers to the above questions is affirmative (YES), the program jumps to a step S26, wherein a down-counting timer tMFMONIDLY is set to a predetermined time period (e.g. 1 sec) and started, followed by determining that the monitoring conditions are not satisfied at a step S27.

On the other hand, if the answers to the questions of the steps S12 to 15 are all negative (NO), it is determined at a step S16 whether or not the throttle valve opening θTH is smaller than a predetermined value θTHIDLE which is close to a fully closed opening value. If the answer is negative (NO), it is determined at a step S17 whether or not a vehicle in which the engine is installed is in a cruising condition, i.e. whether or not the vehicle is in a constant and steady traveling condition. For example, it is determined that the vehicle is in the cruising condition when the variation in the vehicle speed VSP continues to fall within ±0.8 km/h per second over two seconds.

On the other hand, if the vehicle is not in the cruising condition, or if the answer to the question of the step S16 is affirmative (YES), it is determined at a step S18 whether or not the vehicle is in stoppage or stands (VSP=0). If the vehicle is in stoppage, it is determined at a step S19 whether or not the engine rotational speed NE falls within a range between predetermined upper and lower limit values NENLLMTH and NENLLMTL which is to be assumed during a no-load condition (e.g. between 4500 rpm and 500 rpm). If the answer to the question of the step S18 or S19 is negative (NO), the program jumps to the step S26 and then to the S27 to determine that the monitoring conditions are not satisfied. On the other hand, if both of the answers to the questions of the steps S18 and S19 are affirmative (YES), the program proceeds to a step S19A.

At the step S19A, it is determined whether or not the engine coolant temperature TW is higher than a predetermined value TWIGMNL (e.g. 75° C.). If the answer is negative (NO), the program proceeds to the step S26 and then to the step S27 to determine that the monitoring conditions are not satisfied. On the other hand, if the answer is affirmative (YES), it is determined at a step S23 whether or not a change in the operating condition of the engine has been detected.

It is determined that a change has occurred in the operating condition of the engine if a rate of variation ΔθTH in the throttle valve opening θTH or a rate of variation ΔPBA in the intake pipe absolute pressure PBA is larger than a predetermined value, if a change in the electric load, such as ON/OFF of the air conditioner, or ON/OFF of a brake switch, has been detected, or if a change in the vehicle speed has been detected.

When a change in the operating condition of the engine has been detected, the program proceeds to the step S26 and then to the step S27 to determine that the monitoring conditions are not satisfied, whereas if no change has been detected, it is determined at a step S24 whether or not the count value of the timer tMFMONIDLY is equal to 0. If tMFMONIDLY>0 holds, which means that the predetermined time period has not yet elapsed, it is determined at the step S27 that the monitoring conditions are not satisfied, whereas if tMFMONIDLY=0 holds, it is determined at a step S25 that the monitoring conditions are satisfied.

On the other hand, if the answer to the question of the step S17 is affirmative (YES), i.e. if the vehicle is in the cruising condition, a predetermined value PBMONI of the intake pipe absolute pressure is calculated based on the engine rotational speed NE and the atmospheric pressure PA at a step S20, and then it is determined at a step S21 whether or not the detected intake pipe absolute pressure PBA is larger than the calculated predetermined value PBMONI. If PBA≦PBMONI holds, it is then determined at a step S22 whether or not the engine rotational speed NE falls within a range between predetermined upper and lower limit values NERLLMTH and NERLLMTL, which is to be assumed during a loaded condition (e.g. between 6000 rpm and 500 rpm). If the answer to the question of the step S21 or S22 is negative (NO), the program jumps to the step S26 and then to the step S27 to determine that the monitoring conditions are not satisfied. If both of the questions at the steps S21 and S22 are affirmative (YES), the program proceeds to a step S22A.

At the step S22A, it is determined whether or not the engine coolant temperature TW is higher than a predetermined value TWIGMRL (e.g. −15° C.). If the answer is negative (NO), the program jumps to the step S26 and then to the step S27 to determine that the monitoring conditions are not satisfied, whereas if the answer is affirmative (YES), the program proceeds to the step S23 to execute the above described processing.

As described above, according to the FIG. 3 program, when the vehicle is in stoppage, the engine coolant temperature TW is compared with the predetermined value TWIGMNL which is set to a relatively high value, e.g. 75° C., to determine whether or not the monitoring conditions are satisfied. As a result, an erroneous misfire detection can be prevented in an engine coolant temperature region where the combustion state of the engine is unstable during stoppage of the vehicle.

Further, when the vehicle is traveling, the engine coolant temperature TW is compared with the predetermined value TWIGMRL which is set to a relatively low value, e.g. −15° C., to determine whether or not the monitoring conditions are satisfied. As a result, a misfire determination can be carried out with high reliability even in a low engine coolant temperature region where the combustion state of the engine is stable during traveling of the vehicle. The engine coolant temperature range within which the misfire detection can be carried out can thus be enlarged.

Although in the embodiment described above, the misfire determination is carried out based on the measured variation in the crankshaft rotation, this is not limitative. Alternatively, the misfire determination may be carried out by detecting ionic current generated within the combustion chamber during combustion.

What is claimed is:

1. A misfire-detecting system for an internal combustion engine, comprising:

temperature-detecting means for detecting a temperature of said engine;

misfire-detecting means for carrying out detection of a misfire occurring in said engine when said detected temperature falls within a predetermined region;

load-detecting means for detecting a load condition of said engine; and changing means for changing said predetermined region according to said detected load condition of said engine.

2. A misfire-detecting system as claimed in claim 1, wherein said changing means sets said predetermined region to a narrower region by raising a lower limit value of said predetermined region as load on said engine becomes smaller.

3. A misfire-detecting system as claimed in claim 1, wherein said changing means detects a no-load condition of said engine, and sets said predetermined region to a narrower region than in a loaded condition of said engine, by raising a lower limit value of said predetermined region when said no-load condition of said engine is detected.

4. A misfire-detecting system as claimed in claim 3, wherein said no-load condition is a standing condition of a vehicle in which said engine is installed.

5. A misfire-detecting system as claimed in claim 1, wherein said temperature of said engine is a temperature of coolant of said engine.

6. A misfire-detecting system for an internal combustion engine, comprising:

temperature-detecting means for detecting a temperature of said engine;

misfire-detecting means for carrying out detection of a misfire occurring in said engine when said detected temperature falls within a predetermined region;

load-detecting means for detecting a load condition of said engine; and changing means for changing said predetermined region according to said detected load condition of said engine, said changing means sets said predetermined region to a narrower region by raising a lower limit value of said predetermined region as load on said engine becomes smaller.

7. A misfire-detecting system for an internal combustion engine, comprising:

temperature-detecting means for detecting a temperature of said engine;

misfire-detecting means for carrying out detection of a misfire occurring in said engine when said detected temperature falls within a predetermined region;

load-detecting means for detecting a load condition of said engine; and changing means for changing said predetermined region according to said detected load condition of said engine, said changing means detects a no-load condition of said engine, and sets said predetermined region to a narrower region than in a loaded condition of said engine, by raising a lower limit value of said predetermined region when said no-load condition of said engine is detected.

8. A misfire-detecting system as claimed in claim 7, wherein said no-load condition is a standing condition of a vehicle in which said engine is installed.

9. A misfire-detecting system for an internal combustion engine, comprising:
- temperature-detecting means for detecting a temperature of said engine wherein said temperature of said engine is a temperature of coolant of said engine;
- misfire-detecting means for carrying out detection of a misfire occurring in said engine when said detected temperature falls within a predetermined region;
- load-detecting means for detecting a load condition of said engine; and
- changing means for changing said predetermined region according to said detected load condition of said engine.

* * * * *